UNITED STATES PATENT OFFICE.

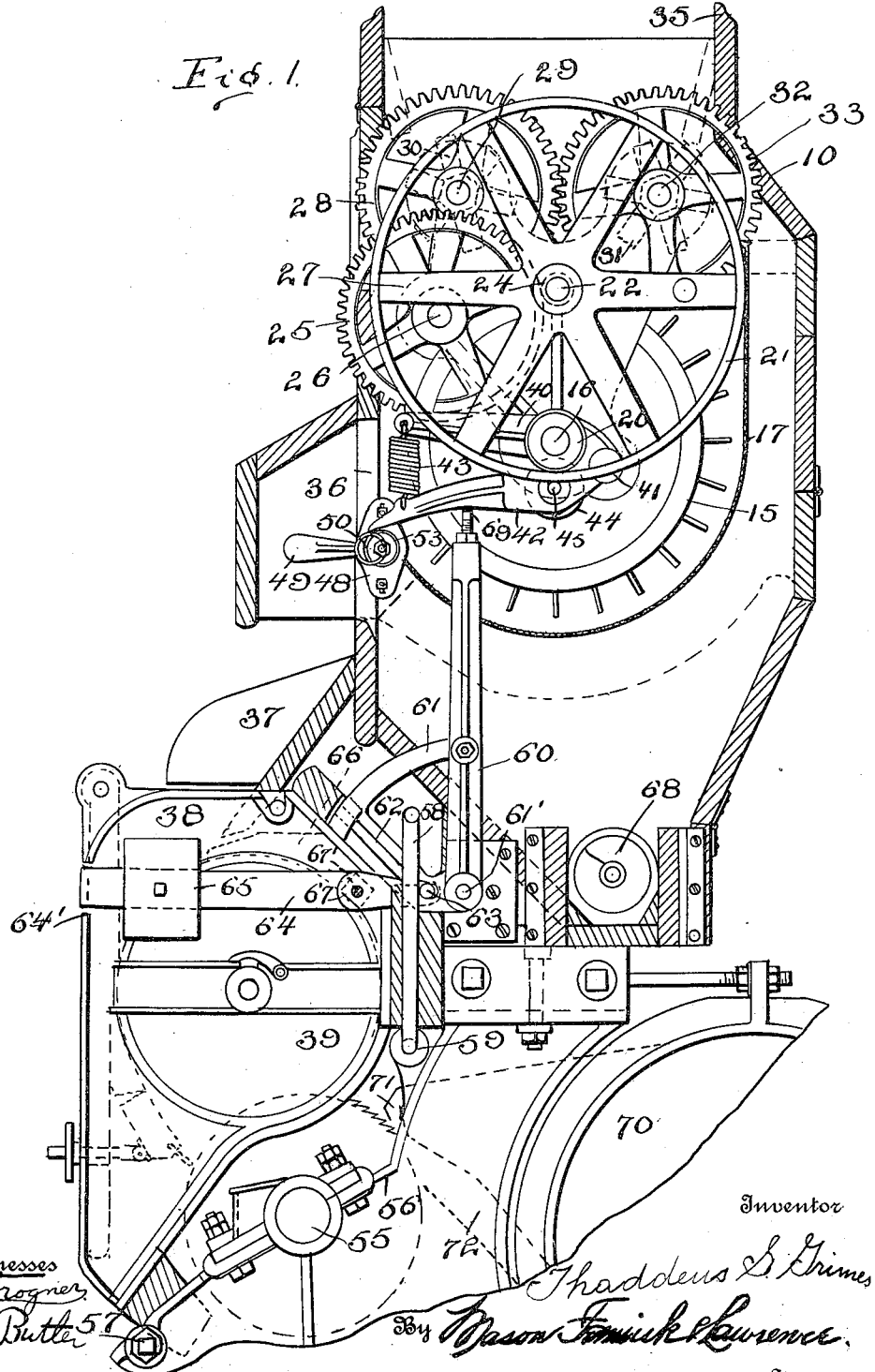

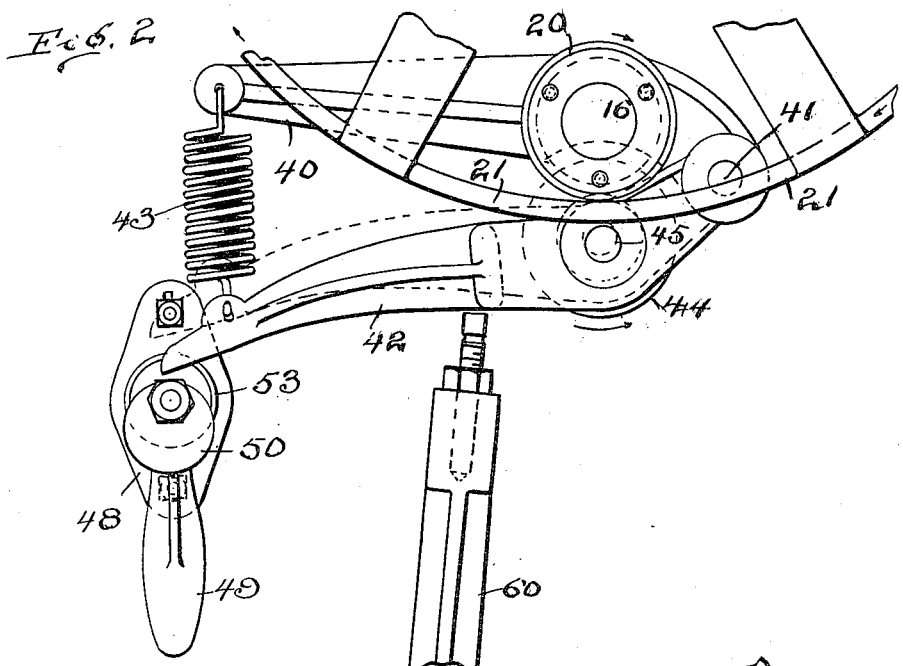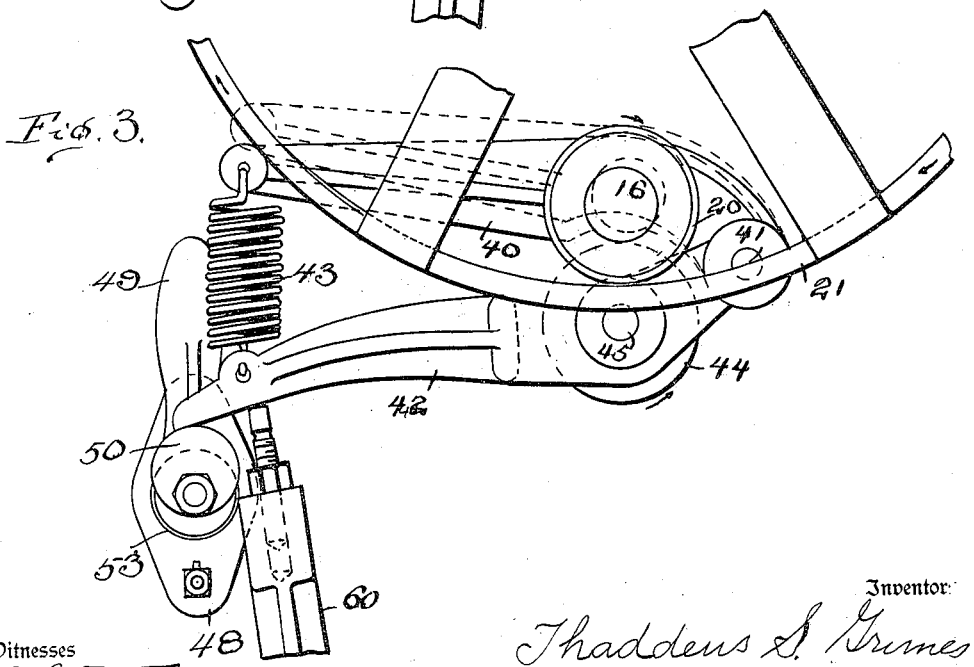

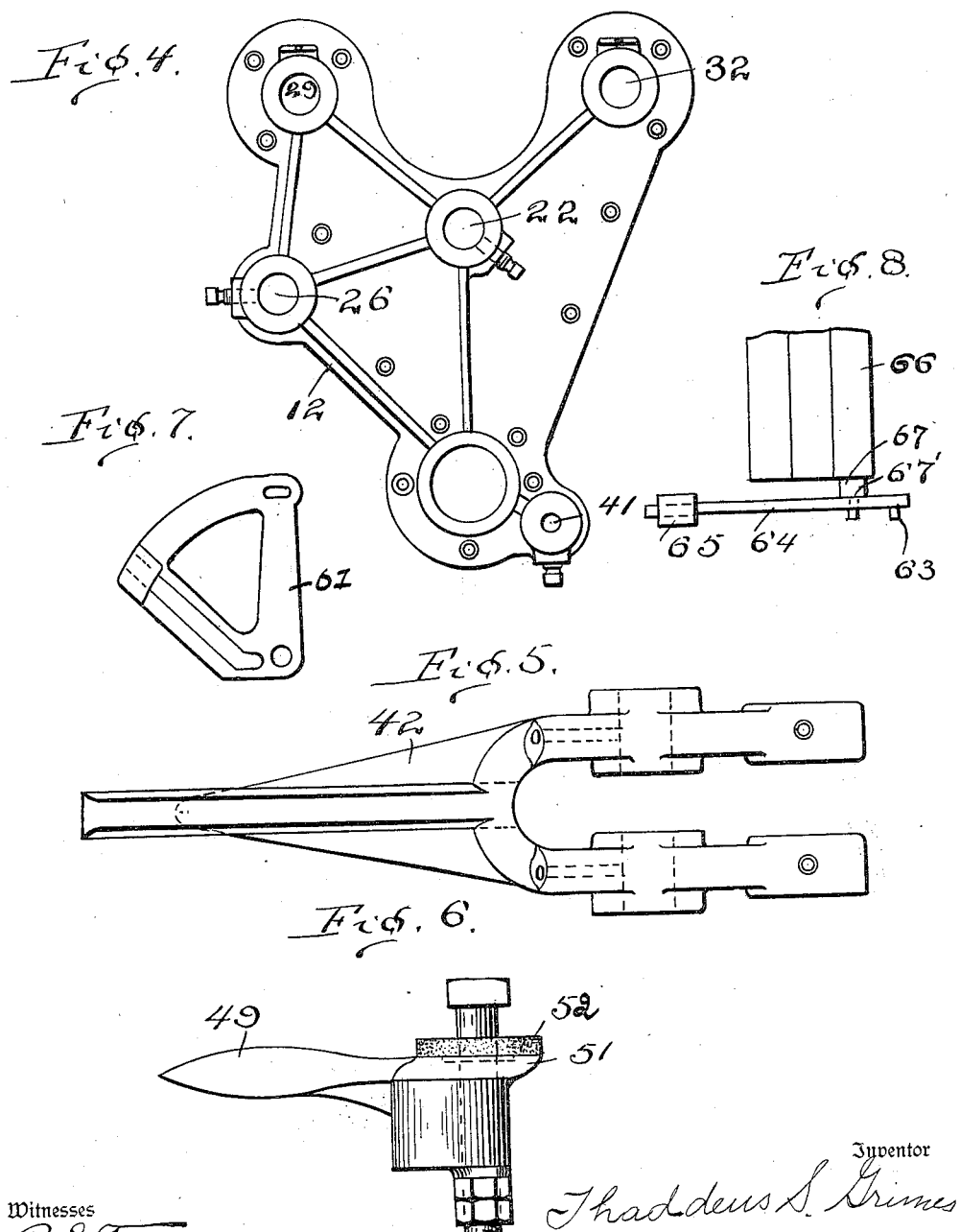

THADDEUS STOW GRIMES, OF COLUMBUS, GEORGIA, ASSIGNOR TO LUMMUS COTTON GIN COMPANY, OF MUSCOGEE COUNTY, GEORGIA, A CORPORATION OF GEORGIA.

VARIABLE-FEED MECHANISM FOR COTTON-GINS.

1,069,413.

Specification of Letters Patent.   Patented Aug. 5, 1913.

Application filed July 5, 1911.   Serial No. 637,019.

*To all whom it may concern:*

Be it known that I, THADDEUS S. GRIMES, a citizen of the United States, residing at Columbus, in the county of Muscogee and State of Georgia, have invented certain new and useful Improvements in Variable-Feed Mechanism for Cotton-Gins; and I do hereby declare the following to be a full, clear, and exact description of the invention, such as will enable others skilled in the art to which it appertains to make and use the same.

This invention relates to variable feed mechanism for cotton gins, linters, and the like.

There is great difference in the condition of seed cotton when received by the ginner, especially in the density, and as a necessary result the rapidity with which it can be ginned varies materially. If the rollers of the feeding mechanism are rotated at uniform speed more cotton will be fed at one time than at another. The best results are obtained when the density of the seed cotton is kept uniform in the roll box, for if the feed is too rapid the roll becomes compact and will stop revolving or break resulting in partial ginning, the seeds being forced out of the roll box owing to excessive hardness of the roll.

One of the chief objects of the present invention is, therefore, to maintain a uniform roll of seed cotton in the roll box, and to attain this result through the control of the feed mechanism.

A further object is to provide means for varying the feed uniformly and gradually from "no feed" to "full feed", and a still further object is to effect this result automatically.

With these and other objects in view, the invention consists in the novel construction hereinafter described and claimed.

In the accompanying drawings forming part of this specification: Figure 1 is a view partly in elevation and partly in vertical section showing the casing of a gin feeder and the operative mechanism. Fig. 2 is a detail view showing a part of the variable feed mechanism. Fig. 3 is a further detail view showing the elements of Fig. 2 under different conditions. Fig. 4 is an elevation of a bracket for carrying the shafts and gears of the feeding mechanism. Fig. 5 is a top plan view of one of the lever arms shown in Figs. 2 and 3 and constituting a part of the variable feed mechanism. Fig. 6 is a plan view of a cam lever for operating the arm shown in Fig. 5. Fig. 7 is a detail view of a bracket mounted adjacent to the roll box of the gin. Fig. 8 is a further detail of mechanism hereafter described.

In carrying out my invention I provide a casing 10 for the gin feeding device, which casing may be of any suitable construction, and mount therein a picker roll 15 said roll being carried by shaft 16 driven by suitable mechanism not shown. A screen 17 is located within the casing and is of substantially the form shown in Fig. 1, a portion of the screen conforming to the configuration of the roll 15.

The several rolls and gears of the gin feeder are mounted in brackets 12 shown in Fig. 4, which are disposed on the sides of the casing 10. Shaft 16 carries a friction roll 20 which may be made of paper or other suitable substance and said roll 20 engages the inner portion of the rim of wheel 21 mounted on shaft 22 and having its bearing in the frame above mentioned. A pinion 24 rotates with wheel 21 and engages the teeth of wheel 25 mounted on shaft 26 carrying a pinion 27 meshing with a gear 28. The gear last mentioned is carried on shaft 29 of the feed roll 30. A corresponding feed roll 31 is carried upon shaft 32 and is driven by gear 33 meshing with gear 28 above mentioned.

The cotton within the upper portion 35 of the casing is brought into engagement with the feed rolls and carried downwardly between the latter, coming into engagement with the spikes of picker roll 15 and passing along the surface of screen 17 is cleaned and passes thence through the opening 36 into the apron 37 and into the roll box 38 of the gin.

In order to provide for the suitable regulation of the feed I have devised a construction by means of which motion is imparted to wheel 21 in a greater or less degree as circumstances may require. An arm 40 is pivoted at 41 and has pivotal connection with a forked arm 42, these arms being secured at the point 41 and being permitted to have vibration at their free ends which are connected by means of a coil spring 43. A roll 44 is eccentrically mounted at 45 on arm 42 and this roll bears against shaft 16 carrying friction roll 20. A plate 48 is adjustably secured to the casing in any suitable manner and to the central portion thereof a lever arm 49 is pivoted, which arm carries a cam 50 designed to bear against the lower curved surface of arm 42. In Fig. 6 the lever arm is shown as being provided with a boss 51 having engagement with a leather washer 52, this washer coming into contact with a corresponding boss 53 on the plate 48. Cam 50 controls the operation of lever 42 under certain conditions and thereby controls the rate of feed of the cotton. By virtue of the eccentric mounting of roll 44 in lever 42, and the adjustment of cam 50, the driving contact between 20 and 21 can be made continuous, or it can be discontinued during all or part of each revolution of roll 44. Other means for controlling lever 42 are also provided.

The roll box 38 is provided at the ends with heads 39, and the saw cylinder is mounted on shaft 55 carried by the framework 56. The roll box is pivoted at 57, and is swung outwardly when desired by means of arm 58 secured at point 59.

Rigidly connected with a lever 60 is a bracket 61 provided with a slot 62, the bracket and the arm being pivoted at 61'. Slot 62 is engaged by a pin 63 carried on lever 64 having a weight 65 on one end thereof. The weight controls the density of the cotton in the roll box, and the movement of the weight and lever is limited by stops 64'. A float 66 is arranged within the roll box and is carried by a bar 67 in bearing members provided in the walls of the roll box. Lever 64 is pivoted at the same point, designated 67' in the drawings. Bracket 61 is shown in detail in Fig. 7 and the mounting of the bar 67 is illustrated in Fig. 8. Arm 60 is provided with an adjustable screw 69 at its upper end. The operation of this construction will be described below.

In the lower part of casing 10 a conveyer 68 is mounted, and serves to carry off the dust and trash collecting in that portion. Air blast pipe 70 is provided with a suitable nozzle 71 and the lint flue is shown at 72.

When the speed regulating devices are in the position shown in Fig. 1, one-half of the full speed is provided. It will be observed that the handle of cam 50 is turned to the left, and that arm 60 is in a vertical position, the upper end thereof being under the central portion of lever arm 42. The position of full feed is shown in Fig. 2. Roll 44 being eccentrically mounted, and arm 42 being free to vibrate as the result of frictional contact between the several rotating members, there will be continuous contact between roll 20 and the rim of wheel 21, and therefore a maximum speed. The weight of the picker roll is carried on shaft 16, causing arm 40 to remain in the position shown in Fig. 2.

In Fig. 3 there will be no feed because lever arm 42 is fixedly supported at its left hand end by cam 50, mechanically operated, or by arm 60, automatically operated. Under these conditions, eccentric roller 44 lifts roller 20 out of contact with the rim of wheel 21, arm 40 then vibrating as shown in dotted lines in Fig. 3.

Any speed desired may be obtained by raising lever 42 a given distance (but not to its highest position), by means of cam 50 or arm 60. When thus raised, arms 40 and 42 will be caused to vibrate, and roller 20 will be lifted from the rim of wheel 21 at regular intervals. These periods of contact will increase if cam 50 is turned toward the position shown in Fig. 2 (the upper arm 40 and the roll carried thereby having less vibration), and the more nearly continuous the frictional contact between roll 20 and wheel 21 becomes, the greater will be the resulting speed of that wheel and of the feed rolls. It will be understood that the intervals of contact will be sufficiently rapid to afford practically a regular feed at the rolls at all speeds.

The regulation may be effected by hand by means of cam 50 alone, but in the drawings I have also shown how the regulation may be effected automatically by means of arm 60. When the roll of cotton in the roll box increases beyond the desired density, float 66 will be lifted, thereby lifting lever 64, pivoted at 67', (by the partial rotation of bar 67) and causing pin 63 to press downward in slot 62, throwing arm 60 toward the required position to decrease the rate of feed. The position of weight 65 controls the density of the roll of cotton in the roll box.

In swinging the roll box forward, to stop ginning, pin 63 causes the movement of bracket 62 and of arm 60, throwing the latter to the "no feed" position, shown in Fig. 3. The reverse operation of these parts, starts the feed automatically.

What I claim as new and desire to secure by Letters Patent is:

1. In a gin feeder, a plurality of feed rolls, means including an eccentrically mounted device for imparting motion thereto, a pivoted lever for carrying said device, and means for controlling said lever from the roll of cotton within the roll box, said means last mentioned including an arm, a slotted member connected therewith, and a device arranged to bear on the roll in the roll box and having connection with said slotted member.

2. In a gin feeder, a plurality of feed rolls, a picker roll, a shaft therefor, a friction roll carried by said shaft, a wheel mounted adjacent to the picker roll and arranged to contact with said friction roll, eccentrically mounted means for controlling the position of the friction roll with reference to the aforesaid wheel and a plurality of devices for controlling the eccentrically mounted means, one of said devices being arranged for operation from a roll box.

3. In a gin feeder, a plurality of feed rolls, means for driving said rolls, means for controlling the speed of the driving means, said means last mentioned including a pivoted lever and an eccentrically mounted device carried thereby and having connection with the driving means, a slotted member, an arm connected therewith and controlling the position of the pivoted lever, a member arranged to be controlled by the roll of cotton within the roll box of a gin, and means whereby said member controls the operation of the slotted member.

4. In a gin feeder, a plurality of feed rolls, a pivoted lever mounted adjacent thereto, an eccentrically mounted device carried by the lever, a cam for controlling the position of said lever and the eccentrically mounted device, means whereby the device last mentioned controls the speed of the feed rolls and a second controlling device, an adjustable member carried thereby arranged to contact with said pivoted lever, and means for automatically controlling said second member by the roll of cotton within the roll box of a gin.

5. In a gin feeder, a plurality of feed rolls, means including an eccentrically mounted device for imparting motion thereto, a pivoted lever for carrying said device, and means for controlling said lever, said means last mentioned including an arm, a pivoted slotted member associated therewith, and means for automatically operating said arm and slotted member and including a weighted lever engaging the slot.

6. In a device of the class described, a lever for controlling a gin feeder, a pivoted slotted member, an arm carried thereby, an adjustable device carried by the arm and arranged to engage the lever, a pivoted and weighted lever mounted in proximity to the roll box of a gin, said lever last mentioned engaging the slot at a point adjacent to the pivotal portion of the aforesaid slotted member.

In testimony whereof I affix my signature in presence of two witnesses.

THADDEUS STOW GRIMES.

Witnesses:
Wm. F. Lupo,
K. Roscoe Lummus.

---

Copies of this patent may be obtained for five cents each, by addressing the "Commissioner of Patents, Washington, D. C."